United States Patent
Yang et al.

(10) Patent No.: US 9,837,112 B2
(45) Date of Patent: Dec. 5, 2017

(54) OPTICAL REFLECTORS FOR USE WITH A NEAR-FIELD TRANSDUCER

(71) Applicant: Seagate Technology LLC, Cupertino, CA (US)

(72) Inventors: Ruoxi Yang, St. Louis Park, MN (US); James Gary Wessel, Savage, MN (US); Rachel Frakie, Bloomington, MN (US); Chubing Peng, Eden Prairie, MN (US); Werner Scholz, Camberwell (AU); Chris Rea, Edina, MN (US); Zoran Jandric, St. Louis Park, MN (US); Mourad Benakli, Eden Prairie, MN (US); Tae-Woo Lee, Eden Prairie, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/709,705

(22) Filed: May 12, 2015

(65) Prior Publication Data
US 2015/0325261 A1    Nov. 12, 2015

Related U.S. Application Data

(60) Provisional application No. 61/991,715, filed on May 12, 2014.

(51) Int. Cl.
*G11B 5/60* (2006.01)
*G11B 5/48* (2006.01)
(Continued)

(52) U.S. Cl.
CPC ........ *G11B 5/6088* (2013.01); *G02B 6/02042* (2013.01); *G02B 6/02052* (2013.01);
(Continued)

(58) Field of Classification Search
CPC ............ G11B 2005/0021; G11B 5/314; G11B 5/6088; G11B 5/09; G11B 5/4866; G11B 5/6005; G11B 7/1353; G11B 7/1384; G11B 7/1387; G11B 2005/001; G11B 2005/0005; G11B 2007/13727; G11B 5/3116; G11B 7/122; G11B 7/124; G11B 7/125; G11B 7/1362; G11B 7/22; G11B 5/02; G11B 6/1228; G11B 5/3133; H01S 5/026; H01S 5/1032; H01S 5/105; H01S 5/187; G02B 2006/12121; G02B 6/02042; G02B 6/02052; G02B 6/1226
(Continued)

(56) References Cited

U.S. PATENT DOCUMENTS 6,738,338 B1 *   5/2004   Maeda ................. G11B 7/1387
                                                                369/112.01
7,412,143 B2     8/2008   Rottmayer et al.
(Continued)

*Primary Examiner* — Dionne H Pendleton
(74) *Attorney, Agent, or Firm* — Hollingsworth Davis, LLC

(57) ABSTRACT

An apparatus is includes a near field transducer positioned adjacent a media-facing surface and at the end of a waveguide having at least one core layer and a cladding layer. The apparatus also includes at least one optical reflector positioned adjacent opposing cross-track edges of the near field transducer and/or adjacent a down-track side of the near-field transducer.

19 Claims, 9 Drawing Sheets

(51) Int. Cl.
  *G02B 6/02* (2006.01)
  *G11B 7/24062* (2013.01)
  *G11B 5/31* (2006.01)
  *G11B 5/00* (2006.01)
  *G02B 6/122* (2006.01)
  *G02B 6/12* (2006.01)

(52) U.S. Cl.
  CPC ............ *G11B 5/314* (2013.01); *G11B 5/3133* (2013.01); *G11B 5/4866* (2013.01); *G11B 7/24062* (2013.01); *G02B 6/1226* (2013.01); *G02B 2006/12121* (2013.01); *G11B 2005/0021* (2013.01)

(58) Field of Classification Search
  USPC ....... 369/13.33, 13.13–13.17, 13.24, 112.02, 369/112.17
  See application file for complete search history.

(56) References Cited

U.S. PATENT DOCUMENTS

| | | | |
|---|---|---|---|
| 7,599,277 B1* | 10/2009 | Kato | G11B 7/124 369/112.09 |
| 7,957,099 B2 | 6/2011 | Tanaka et al. | |
| 8,339,740 B2 | 12/2012 | Zou et al. | |
| 8,576,673 B2 | 11/2013 | Ostrowski et al. | |
| 9,679,594 B1* | 6/2017 | Peng | G11B 5/4866 |
| 2003/0112542 A1 | 6/2003 | Rettner et al. | |
| 2006/0124834 A1* | 6/2006 | Mizutani | G03F 1/14 250/216 |
| 2008/0239541 A1* | 10/2008 | Shimazawa | G11B 5/02 360/59 |
| 2009/0205090 A1* | 8/2009 | Mimouni | B82Y 20/00 850/30 |
| 2011/0096639 A1* | 4/2011 | Matsumoto | G11B 5/3116 369/13.33 |
| 2011/0122737 A1* | 5/2011 | Shimazawa | G11B 5/314 369/13.24 |
| 2011/0149426 A1* | 6/2011 | Araki | G11B 5/314 360/59 |
| 2012/0005793 A1* | 1/2012 | Ocelic | B82Y 20/00 850/32 |
| 2012/0072931 A1* | 3/2012 | Imada | G11B 5/314 720/672 |
| 2013/0043396 A1* | 2/2013 | Shpater | G01J 5/0806 250/353 |
| 2014/0133283 A1* | 5/2014 | Maletzky | G11B 5/314 369/13.33 |
| 2015/0049173 A1* | 2/2015 | Kim | H04N 13/021 348/49 |
| 2015/0170675 A1* | 6/2015 | Shimazawa | G11B 5/314 369/13.33 |
| 2015/0179197 A1* | 6/2015 | Clinton | G11B 5/4866 369/13.33 |

* cited by examiner

OPTICAL REFLECTORS FOR USE WITH A NEAR-FIELD TRANSDUCER

RELATED PATENT DOCUMENT

This application claims the benefit of Provisional Patent Application Ser. No. 61/991,715 filed on May 12, 2014, to which priority is claimed pursuant to 35 U.S.C. §119(e), and which is incorporated herein by reference in its entirety.

SUMMARY

Embodiments described herein are directed to methods and assemblies used in a slider apparatus. Some embodiments are directed to an apparatus that includes a waveguide having at least one core layer and a cladding layer. A near-field transducer positioned at an end of the waveguide and adjacent to a media-facing surface of a recording head. At least one optical reflector is positioned adjacent opposing cross-track edges of the near-field transducers and/or adjacent a down-track side of the near-field transducer. At least part of the optical reflector is located in the cladding layer. In one embodiment, the optical reflector comprises two reflectors that block sidelobes or stray light generated proximate the near-field transducer.

A method is disclosed that includes directing light from an energy source to a waveguide configured to propagate light and illuminating a plasmonic transducer with the light to generate surface plasmons on a surface of the plasmonic transducer. The surface plasmons focus the electromagnetic field in a sub-wavelength spot on a recording medium. The method further includes blocking at least one of the sidelobes or stray light generated proximate the plasmonic transducer via first and second optical reflectors located proximate the near-field transducer.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
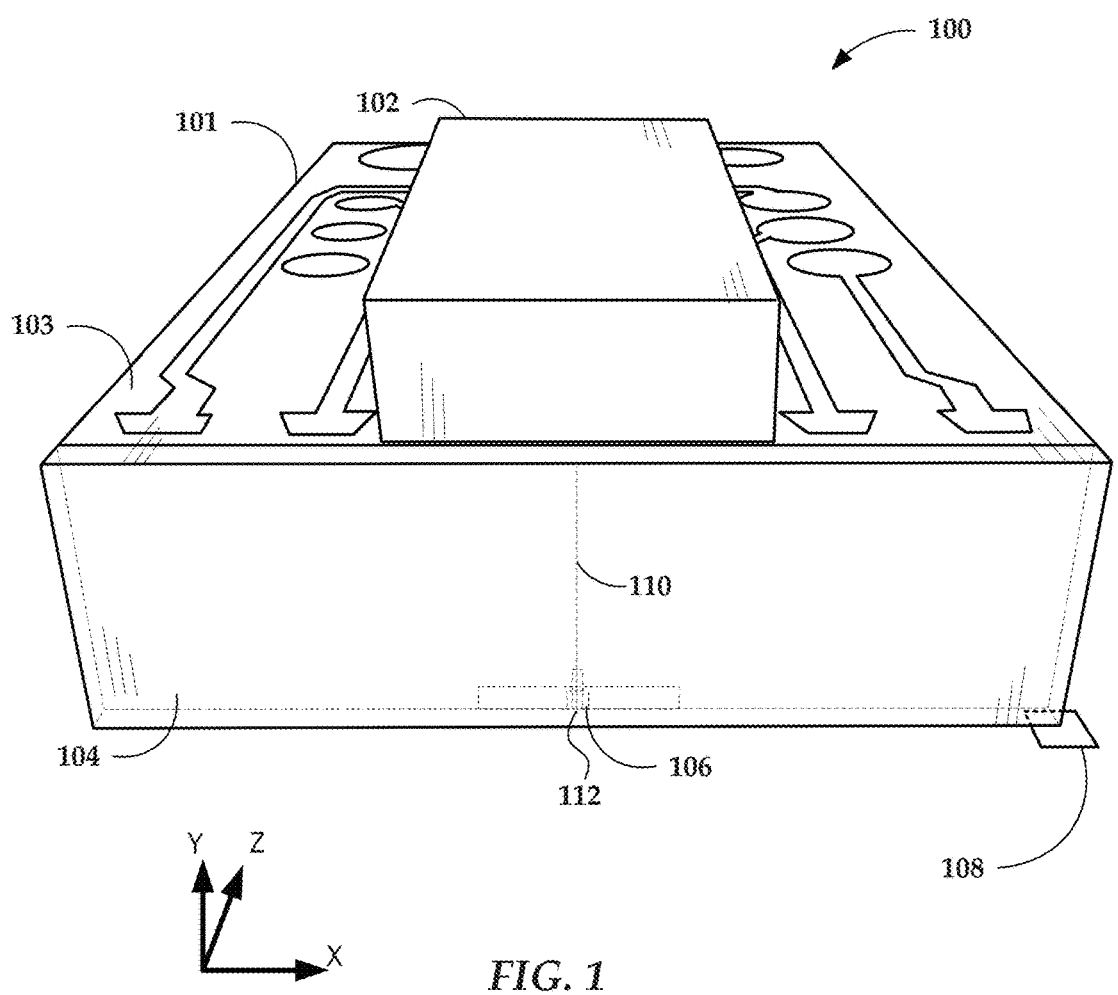
FIG. 1 is a perspective view of a slider assembly according to an example embodiment.

In the following description, reference is made to the accompanying set of drawings that form a part of the description hereof and in which are shown by way of illustration of several specific embodiments. It is to be understood that other embodiments are contemplated and may be made without departing from the scope of the present invention. The following detailed description, therefore, is not to be taken in a limiting sense.

In heat-assisted magnetic recording (HAMR), information bits are recorded on a data storage medium at elevated temperatures, and the data bit dimension can be determined by the dimensions of the heated area in the storage medium or the dimensions of an area of the storage medium that is subjected to a magnetic field. In one approach, a beam of light is condensed to a small optical spot onto the storage medium to heat a portion of the medium and reduce the magnetic coercivity of the heated portion. Data is then written to the reduced coercivity region. Heat assisted magnetic recording is also referred to as thermally-assisted magnetic recording (TAMR), thermally-assisted recording (TAR), and energy-assisted magnetic recording (EAMR).

Current HAMR recording head designs may use a near-field transducer (NFT) that is capable of focusing light to a spot size smaller than the diffraction limit of the light. The NFT is designed to generate local surface plasmon resonances or propagate surface plasmons when subjected to light at a particular wavelength. At resonance, a high electric field surrounding the NFT appears, due to the collective oscillation of electrons in the metal. A portion of the field will extend into the storage medium and get absorbed, raising the temperature of the medium locally for recording. To help dissipate the heat generated in and around the NFT itself, a heat sink can be added.

In heat assisted magnetic recording (HAMR), electromagnetic radiation, for example, visible, infrared or ultraviolet light is directed onto a surface of the data storage media to raise the temperature of a localized area of the media to facilitate switching of the magnetization of the area. Some designs of HAMR recording heads include a thin film waveguide in the form of a solid-immersion mirror on a slider to guide light to the storage media for localized heating of the storage media. The solid-immersion mirror may increase general heating in the recording head. In addition, the solid-immersion mirror may contribute to a back reflection of light emitted through the waveguide. The increased heat and back reflection of light may result in degraded performance of the HAMR device.

In other HAMR designs, a waveguide (e.g., a channel waveguide) may couple light directly to the NFT without the use of a solid-immersion mirror. For example, the NFT may be placed proximate a core of the waveguide at or near a media-facing surface of a read/write head. The light is evanescently coupled to the NFT, which achieves surface plasmon resonance as previously described. This configuration may also exhibit back reflection and scattering of light through the waveguide and through other parts of the read/write head.

Adding reflectors or optical scattering elements to the HAMR device may assist in decreasing the back reflections and help avoid extraneous heating. The reflectors or optical scattering elements may also enhance the performance of a near-field transducer in terms of HAMR areal density and reduce self-erasure or adjacent track erasure. The reflectors or optical scattering elements may be located on the optical path of the waveguide near the air-bearing surface (ABS). The reflectors or optical scattering elements can be configured to shield the background light that is not converted to near-field radiation without perturbing the near-field transducer excitation efficiency. In addition, the reflectors or optical scattering elements need not drastically increase the back reflection or the head temperature. Some constructions of reflectors or optical scattering elements may reduce back reflections. Embodiments disclosed herein involve an apparatus having a waveguide, a near-field transducer, a heat sink and one or more optical reflectors positioned cross-track edges of the near-field transducer. Other embodiments include an optical reflector positioned near a downtrack edge of the near-field transducer.

In reference to FIG. 1, a perspective view shows HAMR slider assembly 100 according to an example embodiment. The slider assembly 100 includes a laser diode 102 located on input surface 103 of a slider body 101. In this example, the input surface 103 is a top surface, which is located opposite to a media-facing surface 108 that is positioned over a surface of a recording media (not shown) during device operation. The media-facing surface 108 faces and is held proximate to the moving media surface while reading and writing to the media. The media-facing surface 108 may be configured as an air-bearing surface (ABS) that maintains separation from the media surface via a thin layer of air.

The laser diode 102 delivers energy to a region proximate a HAMR read/write head 106, which is located near the media-facing surface 108. The energy is used to heat the recording media as it passes by the read/write head 106. Optical coupling components, such as a waveguide 110, are formed integrally within the slider body 101 (near a trailing edge surface 104 in this example) and function as an optical path that delivers energy from the laser diode 102 to the recording media via a plasmonic transducer 112 (also referred to herein as a "near-field transducer"). The plasmonic transducer 112 is near the read/write head 106 and causes heating of the media during recording operations.

The laser diode 102 in this example may be configured as either an edge-emitting laser or surface-emitting laser. A surface-emitting or edge-emitting laser in any of these examples may be directly coupled to the slider body 101, or via an intermediary component such as a submount (not shown). A submount can be used to orient an edge-emitting laser so that its output is directly downwards (negative y-direction in the figure).

While the example in FIG. 1 shows a laser diode 102 directly mounted to the slider body 101, the features discussed herein may be applicable to any type of light delivery configuration. For example, a laser may be mounted on the trailing edge surface 104 instead of the top surface 103. In another configuration known as free-space light delivery, a laser may be mounted external to the slider 100, and coupled to the slider by way of optic fiber and/or waveguide. An input surface of the slider body 101 may include a grating or other coupling feature to receive light from the laser via the optic fiber and/or waveguide.

Figure 2:
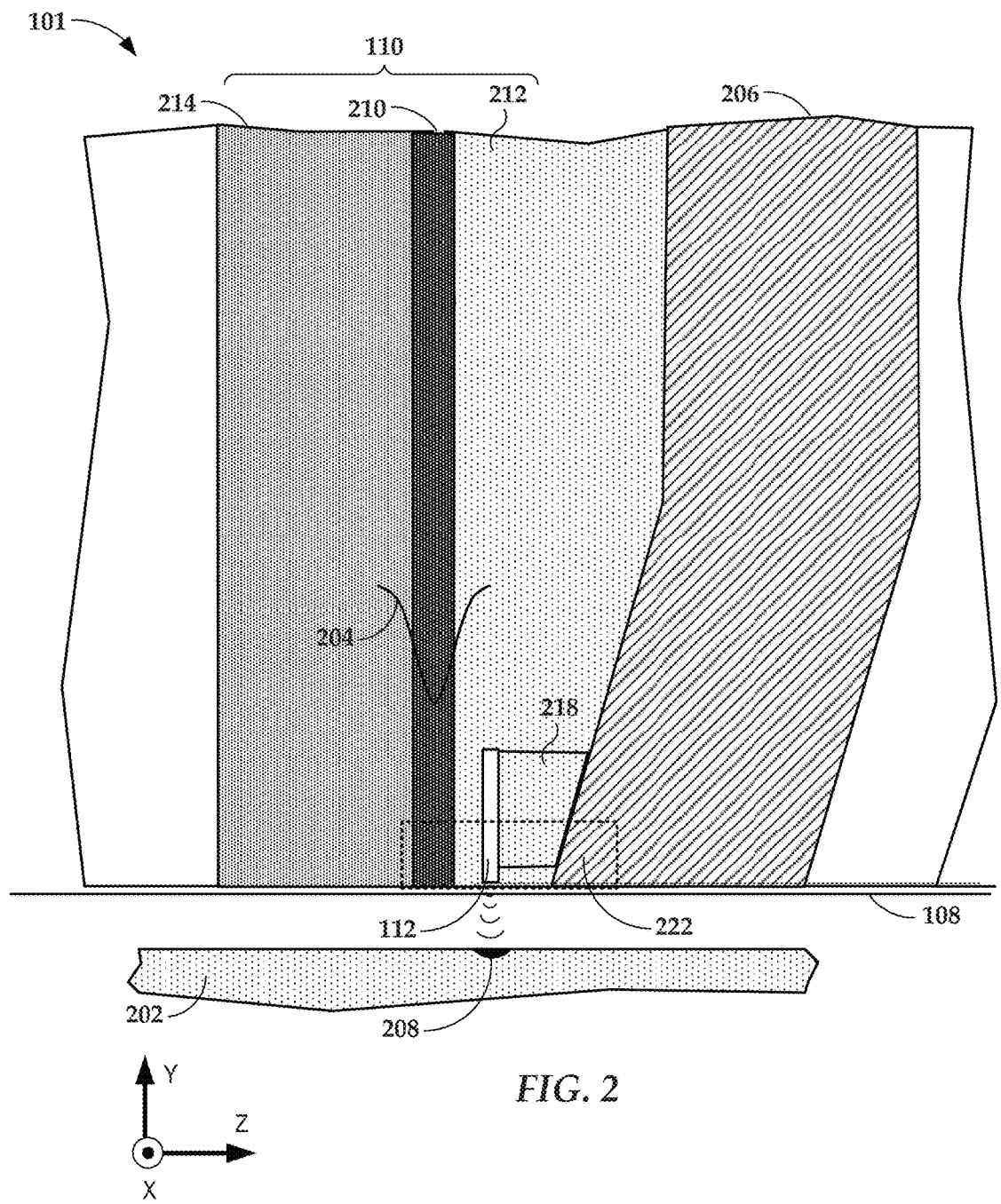
FIG. 2 is a cross-sectional view illustrating portions of a slider body near a plasmonic transducer according to an example embodiment.

In FIG. 2, a cross-sectional view illustrates portions of the slider body 101 near the plasmonic transducer 112 according to an example embodiment. In this view, the plasmonic transducer 112 is shown proximate to a surface of magnetic recording medium 202, e.g., a magnetic disk. The plasmonic transducer 112 may be positioned in or adjacent to the waveguide 110 and at or near the media-facing surface 108. The waveguide 110 delivers electromagnetic energy to the plasmonic transducer 112, which directs the energy to create a small hotspot 208 on the medium 202. A magnetic write pole 206 causes changes in magnetic flux near the media facing surface 108 in response to an applied current. Magnetic flux from the write pole 206 generates a magnetic field in the recording media overlapping the hotspot 208 and setting the magnetization direction in the media as it moves past the write pole 206 in the downtrack direction (z-direction).

The waveguide 110 includes a layer of core material 210 surrounded by cladding layers 212, 214. The core layer 210 and cladding layers 212, 214 may be made from dielectric materials selected so that the refractive index of the core layer 210 is higher than refractive indices of the cladding layers 212, 214. This arrangement of materials facilitates efficient propagation of light through the waveguide 110.

The light 204 applied to the plasmonic transducer 112 to create the hotspot 208 can cause a significant temperature rise in the plasmonic transducer 112. The plasmonic transducer 112 may be formed from a relatively soft plasmonic metal (e.g., Au, Ag, Cu, Al, and alloys thereof) that is prone to deformation at high temperature. As a result, a heat sink 218 may be formed proximate to (or integral with) the plasmonic transducer 112. The heat sink 218 may be comprised of a non-magnetic material, such as, for example, gold (Au) and may be chosen such that the heat sink 218 does not interfere with the resonance of the plasmonic transducer 112. The heat sink 218 may be thermally coupled to other components (e.g., the write pole 206) in order to draw heat away from the plasmonic transducer 112.

Additionally, an optical reflector 222 is positioned adjacent to the plasmonic transducer 112. The optical reflector may comprise a first and second optical reflector 222 that are each positioned in opposing cross-track (x-direction) edges of the plasmonic transducer 112. In some embodiments, the optical reflector 222 is positioned at the media-facing surface 108. The optical reflector 222 may also be positioned within an edge of a cladding layer 212, 214 of the waveguide 110.

The optical reflector 222 is configured to shield background light that is not converted to near-field radiation without reducing excitation efficiency of the plasmonic transducer 112. The optical reflector 222 may also reduce background heating and reflection. The background heating and reflection may be generated by sidelobes produced by a solid-immersion mirror (not shown). Solid-immersion mirror sidelobes may adversely affect the thermal profile generated on the media by increasing the thermal spread. In other cases, the background heating and reflection may be generated at a terminating end of the waveguide core 210 where no solid-immersion mirror is used. In either case, the optical reflector 222 is configured to reduce the head temperature and/or back reflection. The optical reflector 222 helps shape the thermal profile by significantly decreasing the cross-track and down-track thermal spread, and increases areal density capability (ADC).

The optical reflector 222 may also be connected to the heat sink 218 or with an additional heat sink channel near the write pole 206 to help reduce local heating. In some embodiments, the optical reflector 222 may be integrated with a diffuser under or surrounding the write pole 206. The optical reflector 222 allows for the head to include a wide variety of solid-immersion mirror light delivery (e.g., WPHS, improved media, dual core, etc.) as well as a channel waveguide with no solid-immersion mirror. In some embodiments, the optical reflector 222 may work with any solid-immersion mirror based light delivery, single core or dual core, or may be integrated with the write pole heat sink (WPHS). The presence of an optical reflector 222 will help to prevent the increase of head temperature and back light reflection.

Figure 3:
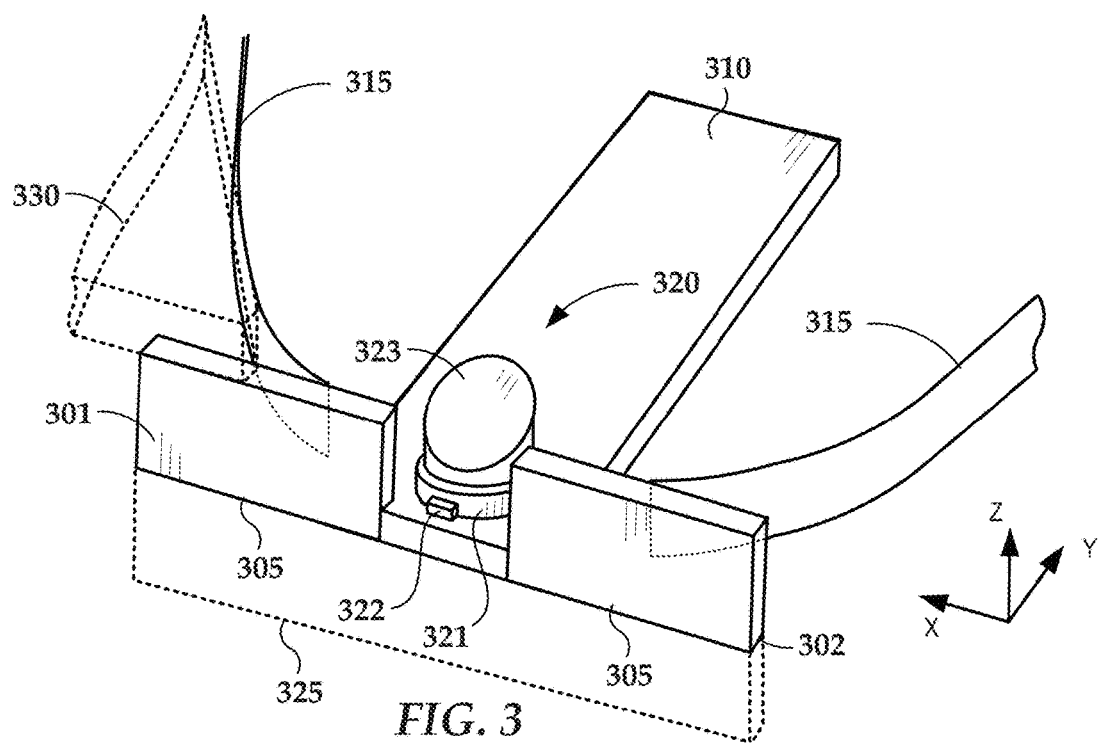
FIG. 3 is a perspective view of an example embodiment, including a single core waveguide.

FIG. 3 illustrates a perspective view of optical reflectors used with a single core waveguide, according to an example embodiment. A plasmonic transducer 320 is located adjacent to a waveguide 310 and between optical reflectors 301, 302 in the cross-track direction (x-direction). The plasmonic transducer 320 includes a disk 321 and a peg 322 and has a sloped heat sink 323 that is adjacent the write pole (not shown). The optical reflectors 301, 302 are positioned with a sides 305 adjacent the media-facing surface.

An optional solid-immersion mirror 315 may be used to focus light on the near-field transducer 320, which is located in a focal region of the solid-immersion mirror 315. If the solid-immersion mirror 315 is used, the waveguide 310 may extend farther in the cross-track direction (x-direction), e.g., configured as a planar waveguide. The optical reflectors 301, 302 are positioned to block sidelobes produced by one or both of the near-field transducer 320 and the solid-immersion mirror 315. The optical reflectors 301, 302 may have an x-direction separation of about 300 nm. The optical reflectors 301, 302 may have a cross-track length of about 700 nm and a down-track (z-direction) width of about 300 nm to 350 nm. In some embodiments, the cross-track dimension may be much larger, for example several microns, and the down-track dimension may also be much larger, for example 2 um. The optical reflectors 301, 302 may have a thickness (y-direction) that is thicker than a skin depth of the light generated by the laser diode.

In some embodiments, the thickness of the optical reflectors 301, 302 may be about 50 nm to 75 nm. In some embodiments, the optical reflectors 301, 302 include a gold layer, and the optical reflectors 301, 302 may have thickness that is greater than the skin depth of the laser diode light in gold. The optical reflectors 301, 302 may also be positioned with edges in a cladding layer (not shown) to reduce local heating on sharp corners.

The optical reflectors 301 may be thermally coupled to a heat sink 330 that extends away from the media facing surface. A corresponding heat sink may be coupled to optical reflector 302, but is not illustrated here for purposes of clarity in the drawing. Generally, the heat sink 330 (also referred to as a heat spreader) draws heat away from the near-field transducer 320 and write pole. The heat sink 330 may be made from the same or different materials than the optical reflector 301. As indicated by region 325, the optical reflectors 301, 302 may be joined via a blocking region that is located downtrack from the near-field transducer 320 in a direction away from the write pole.

Figure 4A:
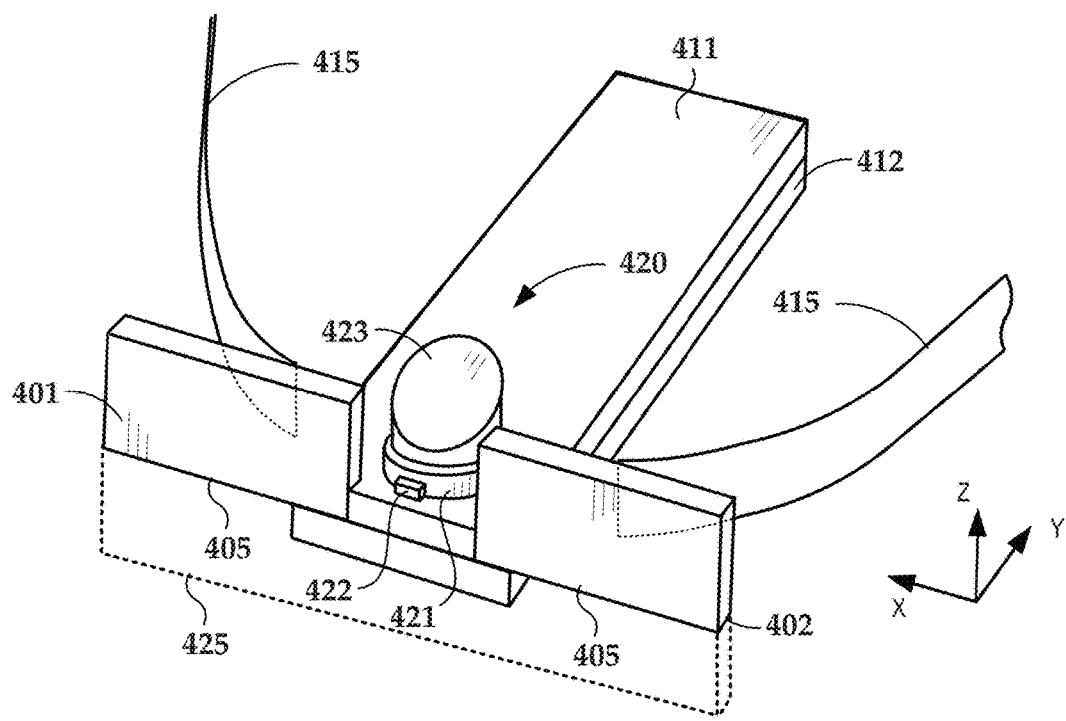
FIG. 4A is a perspective view of an example embodiment, including a dual core waveguide.

FIG. 4A illustrates a perspective view of optical reflectors used with a dual core waveguide, according to an example embodiment. In this embodiment, a waveguide that delivers energy to a plasmonic transducer 420 has multiple waveguide cores 411, 412. The plasmonic transducer 420 is located adjacent to the dual waveguide cores 411, 412 and between optical reflectors 401, 402. The waveguide cores 411, 412 may be spaced apart in the z-direction further than illustrated, and may also be offset in the z-direction relative to the optical reflectors 401, 402, e.g., so that none or both of the waveguide cores 411, 412 intersect with the optical reflectors 401, 402. The plasmonic transducer 420 includes a disk 421 and a peg 422 and has a sloped heat sink 423 that is adjacent the write pole (not shown). The optical reflectors 401, 402 are positioned with sides 405 adjacent the media-facing surface.

An optional solid-immersion mirror 415 may be used to focus light on the near-field transducer 420, which is located in a focal region of the solid-immersion mirror 415. If the solid-immersion mirror 415 is used, the waveguide cores 411, 412 may extend farther in the cross-track direction (x-direction), e.g., configured as a planar waveguide. The optical reflectors 401, 402 are positioned to block sidelobes produced by one or both of the near-field transducer 420 and the solid-immersion mirror 415. The optical reflectors 401, 402 may be separated in the x-direction by a distance of about 300 nm. The optical reflectors 401, 402 may have a cross-track (x-direction) length of about 700 nm and a down-track (z-direction) width of about 300 nm to 350 nm. In some embodiments, the cross-track dimension may be much larger, for example several microns, and the down-track dimension may also be much larger, for example 2 um. The optical reflectors 401, 402 may have a thickness (y-direction) that is thicker than plasmonic metal skin depth, which in some embodiments may be about 50 nm to 75 nm. The optical reflectors 401, 402 may be used with a heat sink similar to heat sink 330 in FIG. 3. As indicated by region 425, the optical reflectors 401, 402 may be joined via a blocking region that is located downtrack from the near-field transducer 320 in a direction away from the write pole.

Figure 4B:
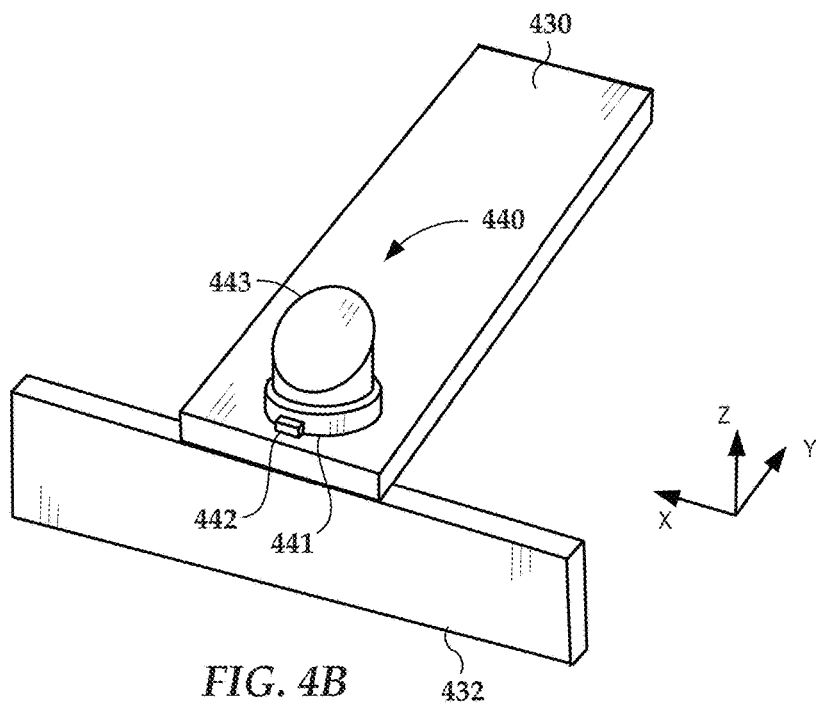
FIG. 4B is a perspective view of an example embodiment, including a channel waveguide and a downtrack optical reflector.
Figure 5:
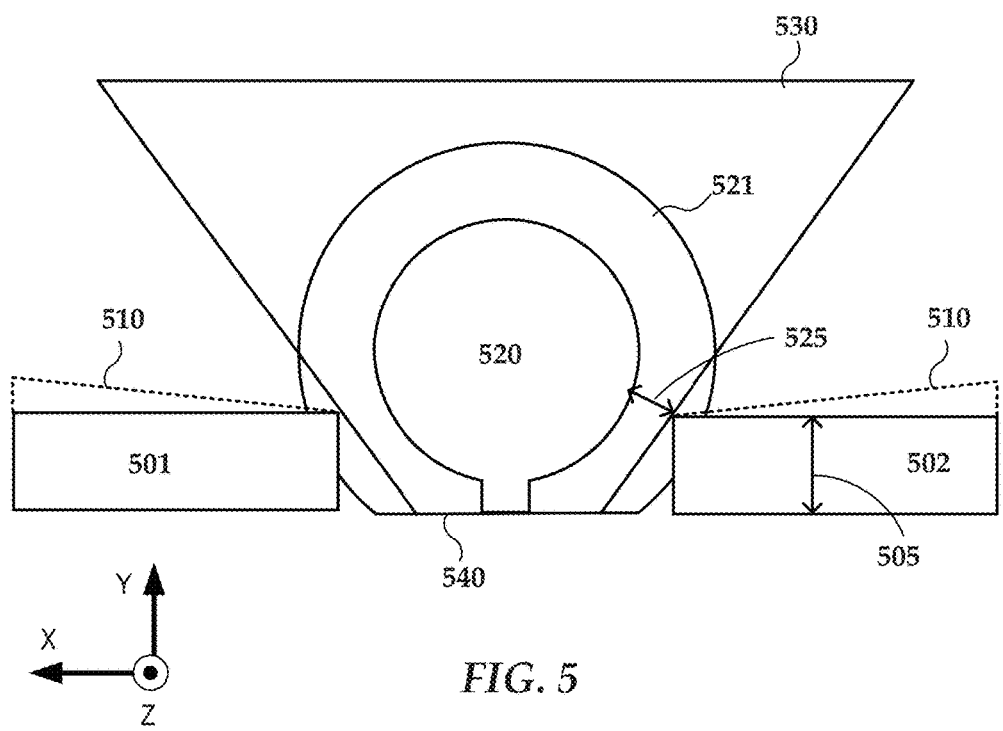
FIG. 5 is a block diagram of optical reflectors in relation to the plasmonic transducer.

FIG. 4B illustrates a perspective view of a down-track optical reflector according to an example embodiment. In this embodiment, a channel waveguide core 430 delivers energy to a plasmonic transducer 440 via direct coupling. The plasmonic transducer 440 includes a disk 441 and a peg 442 and has a sloped heat sink 443 that is adjacent the write pole (not shown). An optical reflector 432 is adjacent the media-facing surface and adjacent a down-track (z-direction) side of the near-field transducer 440. No solid immersion mirror is shown in this example, although a solid-immersion mirror may optionally be used. The optical reflector 432 may extend in the z-direction closer or further to the peg 442. In the former case, the optical reflector 432 may cover some or all of waveguide core 430 at the media-facing surface. This reflector 432 is configured to block lobes that emanate in a downtrack direction. The reflector 432 is at least partially located in a cladding layer (not shown) surrounding the waveguide core 430, FIG. 5 illustrates a block diagram of the optical reflectors in relation to the plasmonic transducer, according to an example embodiment. The optical reflectors 501, 502 are positioned along the media-facing surface 540 and on opposing sides of the plasmonic transducer 520 in the cross-track direction (x-direction). The write pole 530 is positioned adjacent to the plasmonic transducer 520 at a sloped angle and overlapping the plasmonic transducer 520 in the z-direction. The optical reflectors 501, 502 may have dimensions as described above in the description of FIGS. 3 and 4A, and a heat sink similar to heat sink 330 in FIG. 3 may be used with optical reflectors 501, 502. Further, the optical reflectors 501, 502 may be joined by a downtrack blocking region as indicated by portions 325 and 425 in FIGS. 3 and 4A.

The edges of the optical reflectors 501, 502 are positioned within a buffer region 521 of the plasmonic transducer 520. The distance 525 between the optical reflectors 501, 502 and the plasmonic transducer 520 is large enough (e.g., about 50 to 100 nm) to maintain plasmonic transducer 520 performance. The optical reflectors 501, 502 help to block a sidelobe generated by a solid-immersion mirror (not shown). In some embodiments, the optical reflectors 501, 502 (or upper surfaces thereof) may be positioned at a tuned blocker angle relative to incoming light to help reduce back-reflection to the waveguide and laser diode, as indicated by dashed lines 510 (e.g., about 10 to 40 degrees). Generally, in this configuration, the light blockers each include at least one surface that faces away from and is non-parallel to the media-facing surface 540.

The edge of an optical blocker 501, 502 may be positioned further into the waveguide core to avoid extraneous local heating. As evidence in Table 1 below, the farther an optical blocker protrudes into the waveguide core the lower the temperature of the local hotspot on the media. The media-head temperature ratio (MH) is a ratio between the media temperature (Media T) and the optical blocker (Blocker T).

TABLE 1

| Blocker edge | Blocker T | Peg T | Media T | MH |
| --- | --- | --- | --- | --- |
| Halfway (100 nm) | 5.96 | 4.84 | 34.37 | 5.77 |
| Thru core | 4.33 | 4.33 | 31.81 | 7.35 |
| No blocker | 4.47 | 4.47 | 40.41 | 9.04 |

Figure 6:
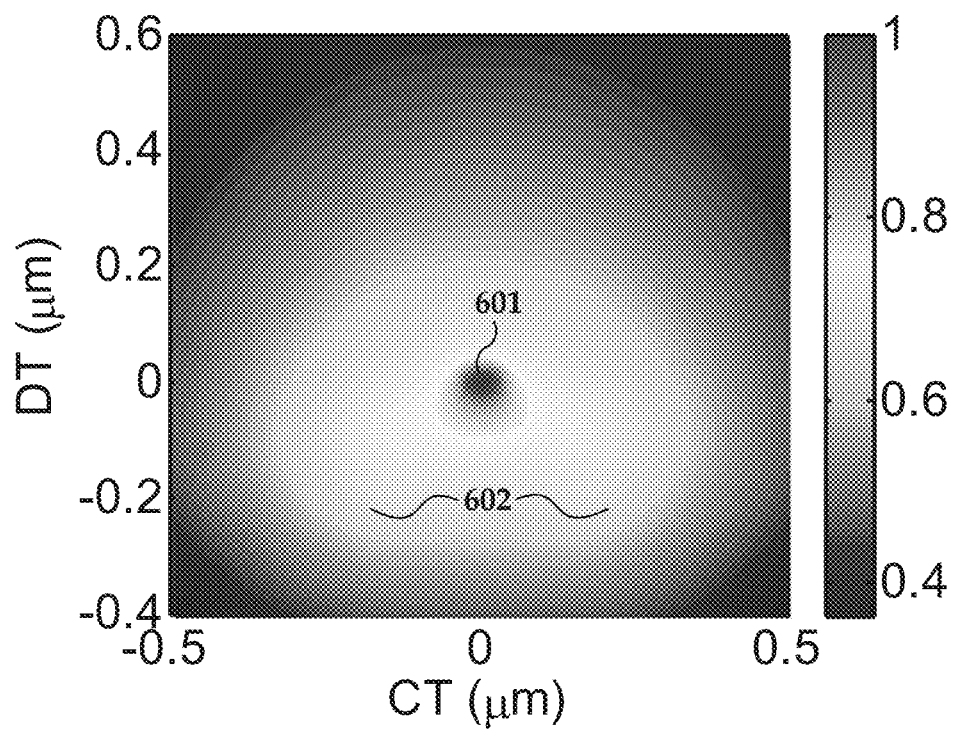
FIG. 6 is a model of the thermal profile produced on the media by the plasmonic transducer with no optical reflectors.

FIG. 6 illustrates a model of the thermal profile produced on the media by the plasmonic transducer with no optical reflectors (blockers). The plasmonic transducer produces a well-defined spot 601 located near the center of the down-track (DT) axis and cross-track (CT) axis. Volume production of the components, such as the plasmonic transducer and solid-immersion mirror, may create variations in the components. Due to the variations, the plasmonic transducer may operate off resonance. Additionally, variations in the solid-immersion mirror may comprise deviations from a perfect parabolic shape in the solid-immersion mirror sides or the solid-immersion mirror focal point may not be at the correct location. The variations may result in additional light energy hotspots 602 that are adjacent to the well-defined center spot 601.

These additional light energy hotspots 602 may increase the size of the heated portion of the media, resulting in an increase in the information bit size or adversely affecting data bits written in adjacent tracks of the media. Also, light that is not properly coupled into the plasmonic transducer may reach the media surface as background light. The additional light energy hotspots 602 may sometimes be called sidelobes. The location of the sidelobes may be determined by the transverse field Ex (distance<lambda/$n_{eff}$). The solid-immersion mirror excitation may generate large transverse fields at the core level, becoming a major contribution to thermal ATI.

Figure 7:
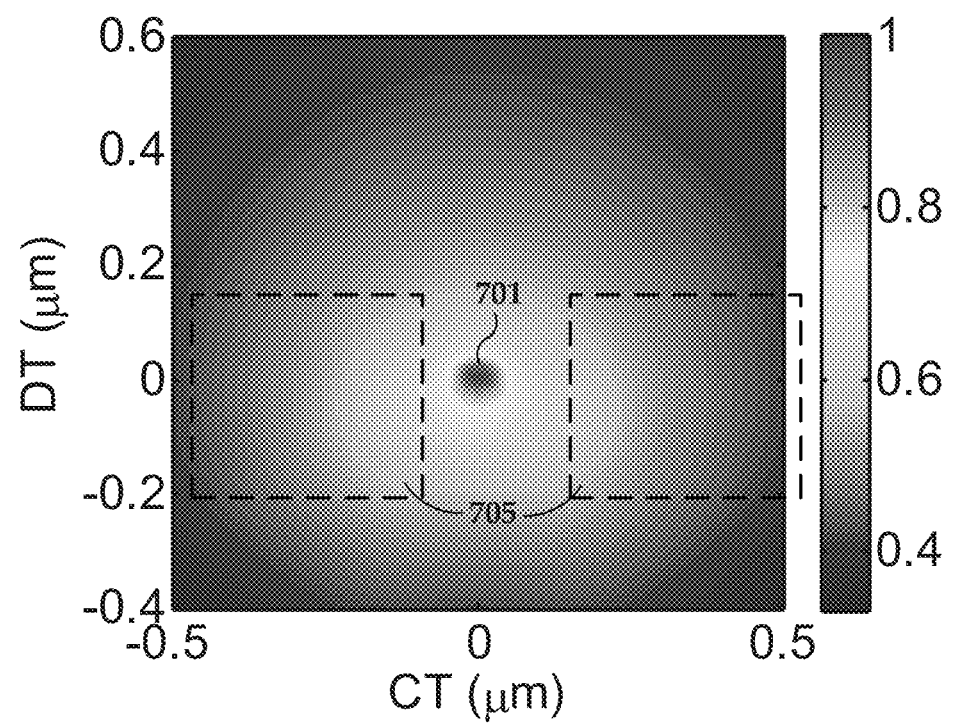
FIG. 7 is a model of the thermal profile produced on the media by the plasmonic transducer with optical reflectors.

FIG. 7 illustrates a model of the thermal profile produced on the media by the plasmonic transducer with optical reflectors (blockers). The plasmonic transducer produces a well-defined spot 701 located near the center of the down-track (DT) axis and cross-track (CT) axis. The optical reflectors 705 are placed on opposing sides of the well-defined spot 701 in the cross-track direction. The optical reflectors 705 help to dissipate the intensity of the stray energy produced by the plasmonic transducer as evidenced in FIG. 6. The spread of the sidelobes in FIG. 7 is significantly reduced due to the presence of optical reflectors 705.

Figure 8:
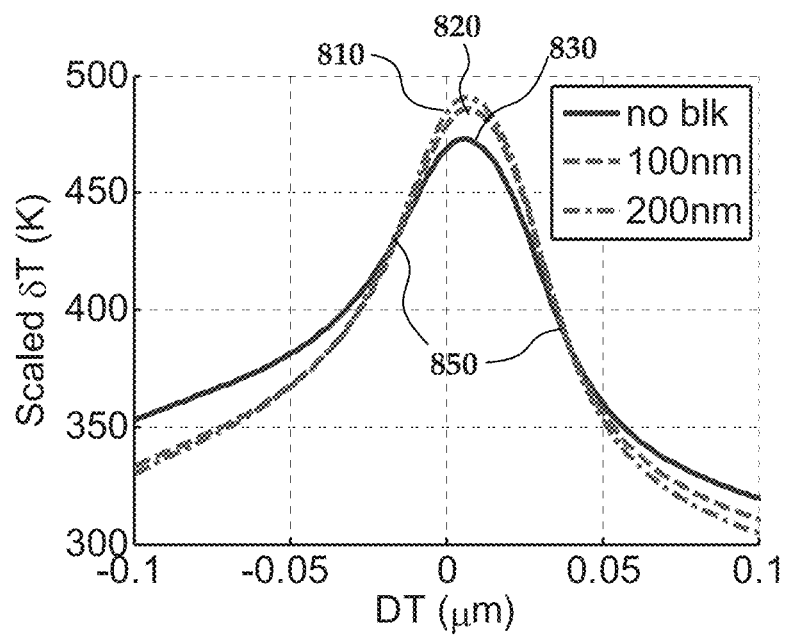
FIGS. 8-9 are graphs of the thermal profile on the media in the down-track and cross-track direction.
Figure 9:
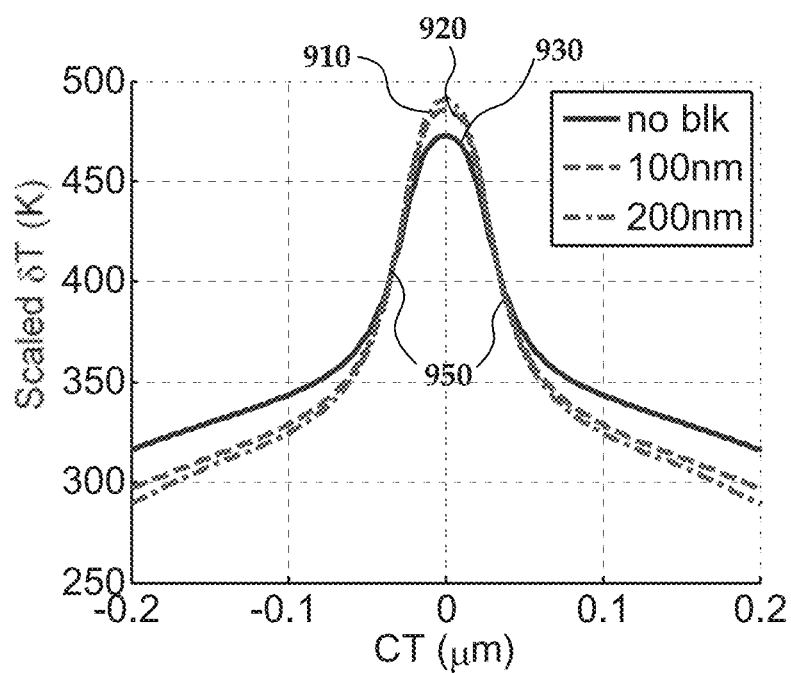

FIGS. 8-9 illustrate graphs of the thermal profile on the media in the down-track (DT) direction, FIG. 8, and in the cross-track (CT) direction, FIG. 9. In FIG. 8, at the center spot in the down-track direction, the media profile with the highest thermal reading is a result of the optical reflectors that protrude into the waveguide core by 200 nm 810, the media profile with the next highest reading is a result of the optical reflectors that protrude into the waveguide core by 100 nm 820 and the media profile with the lowest thermal profile is a result of no optical reflectors 830 being present. The thermal profile begins to decrease the farther from the center spot.

At distances away from the center, locations 850 on the graph, the media thermal reading with no optical reflector 830 is higher than the media thermal readings with an optical reflector present 810, 820. Similarly, in FIG. 9, media thermal readings for the sliders that contain optical reflectors 910, 920 is higher at the center of the cross-track (CT) direction than the media thermal reading of the slider with no optical reflector 930. Also similarly, at the distance 950 from the center and farther out, the media thermal reading is higher for the slider with no optical reflector 930 than it is for the sliders with optical reflectors 910, 920, with the optical reflectors protruding 200 nm and 100 nm, respectively, into the waveguide core.

The optical reflectors assist in concentrating the plasmonic transducer energy at the center spot and increasing the expected thermal profile at that location, resulting in a higher temperature than produced by a plasmonic transducer with no optical reflector. The optical reflectors also reduce the amount of energy observed by the media at distances away from the center point. Additionally, the optical reflectors reduce the thermal profile at a faster rate than if the optical reflectors were not present. At a distance away from the center, the sliders that contain optical reflectors will have a lower temperature profile than sliders that do not contain optical reflectors. This relatively lower temperature profile associated with the presence of optical reflectors will continue as the distance from the center increases from that overlapping distance.

Figure 10:
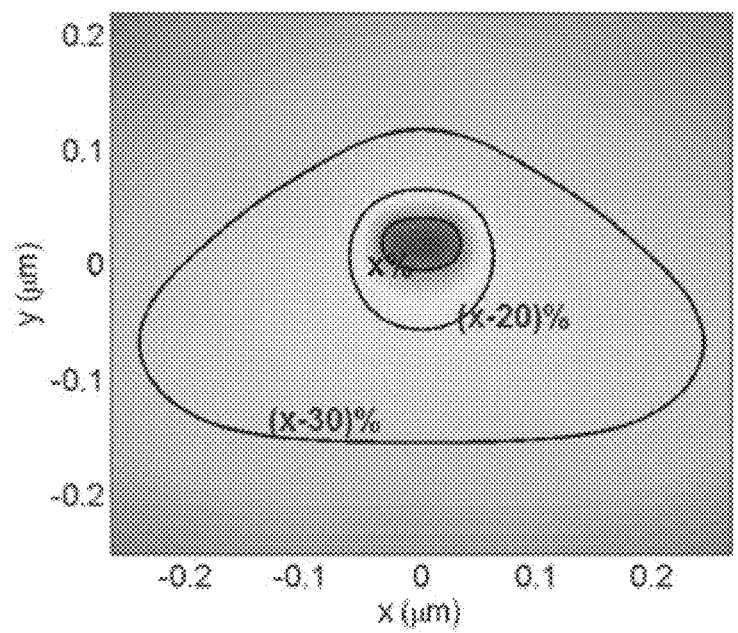
FIGS. 10-11 are models of a thermal profile of a media, according to an example embodiment.
Figure 11:
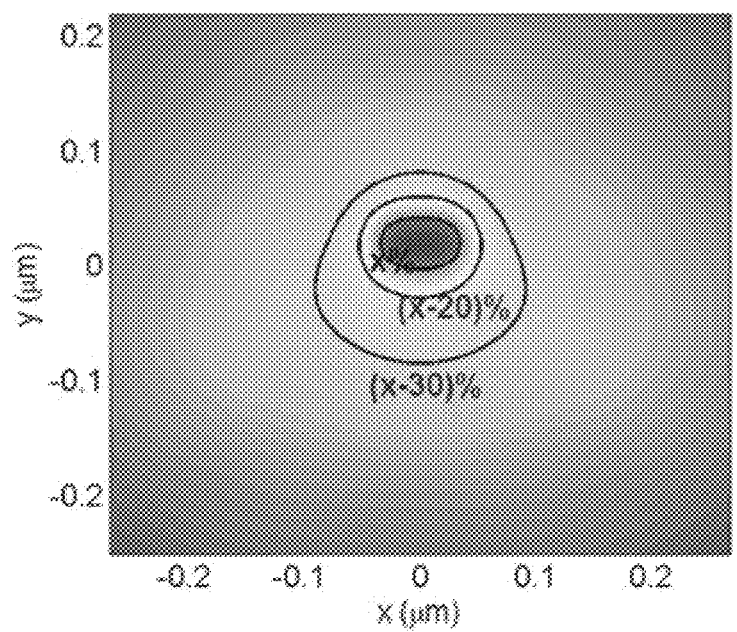

The graphs in FIGS. 10-11 illustrate a thermal profile model of the media, according to an example embodiment. FIG. 10 illustrates the thermal profile of a media interacting with a baseline waveguide core without an optical reflector present. Without an optical reflector blocking stray energy from the plasmonic transducer or solid-immersion mirror, there is a much larger thermal spread. The cross-track direction is along the x-axis and the down-track direction is along the y-axis. The center point on the thermal profile has the highest temperature and the area enclosed by x % maintains a consistent thermal profile at that highest temperature. The (x−20)% circle represents a temperature profile area that is about 20% less than the higher temperature at the center. The (x−30)% circle represents a temperature profile area that is about 30% less than the higher temperature at the center. The farther these (x−20)% and (x−30)% thermal profiles extend, the more likely the media is at risk for self-erasure and multiple adjacent track interference.

FIG. 11 illustrates the thermal profile of a media interacting with a baseline waveguide core with an optical reflector present. Similar to FIG. 10 above, FIG. 11 displays a circle around x %, (x−20)% and (x−30%) to represent the thermal profiles for the highest temperature, 20% less than the highest temperature and 30% less than the highest temperature, respectively. The presence of optical reflectors helps to reduce the thermal spread observed by the media. The thermal profile spread is contained to a much smaller area due to the presence of optical reflectors. Confining the thermal profile assists in reducing instances of self-erasure and multiple adjacent track interference. Table 2 below represents metrics of the media as shown in FIGS. 10 and 11.

TABLE 2

|  | sMH | MT (K/mW) | sTGx (K/nm) | CW(x-20) (nm) side track erasure | ΔDT (nm) on- track erasure |
| --- | --- | --- | --- | --- | --- |
| No blocker | 6.81 | 65.9 | 4.338 | 128 | 85 |
| Blocker | 5.75 | 56.7 | 5.471 | 109 | 47 |

Figure 12:
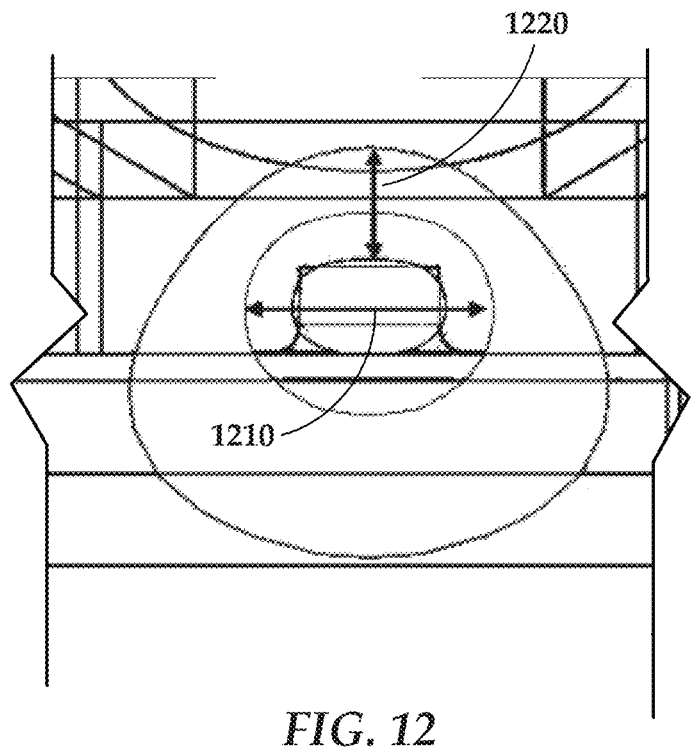
FIGS. 12-13 illustrate results of simulation of dual core waveguide with and without an optical reflector.

FIG. 12 illustrates results of a simulation of a dual core waveguide without an optical reflector. The temperature gradients observed by the media are more spread out without the presence of optical reflectors. CTE (Cross-Track Erasure) (20%) 1210 represents the distance across a cross-track path of a temperature gradient that is 20% less than the temperature gradient located at the center of the light energy from the waveguide and NFT. DTE (Down-Track Erasure) (30%) 1220 represents the distance, in the down-track direction, from the center temperature gradient to the edge of a temperature gradient that is 30% less than the center temperature gradient.

Figure 13:
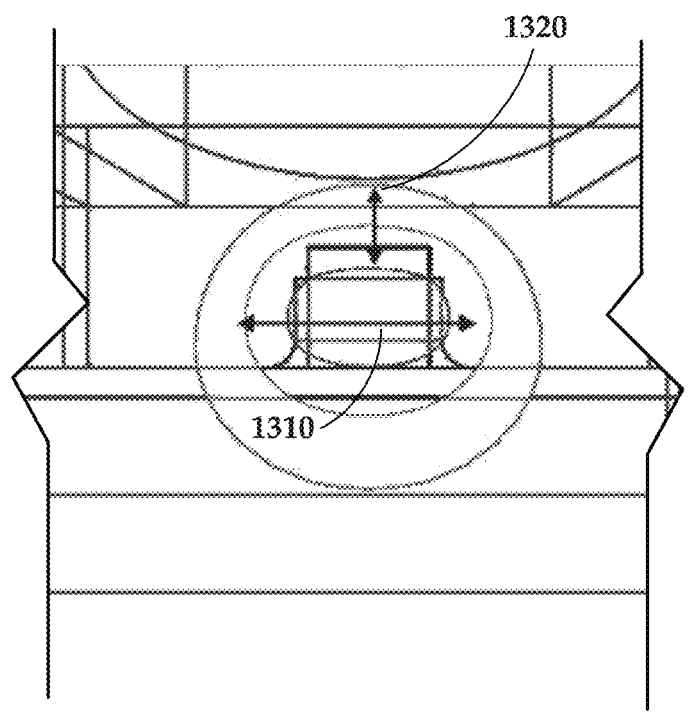

FIG. 13 illustrates results of a simulation of a dual core waveguide with an optical reflector. CTE (20%) 1310 represents the distance across a cross-track path of a temperature gradient that is 20% less than the temperature gradient located at the center of the light energy from the waveguide and NFT. DTE (30%) 1320 represents the distance, in the down-track direction, from the center temperature gradient to the edge of a temperature gradient that is 30% less than the center temperature gradient. The distances measured for the dual core waveguide with optical reflectors are less than the distances measured for the dual core waveguide without. This information is transcribed in Table 3 below. Table 3 represents metrics of the analysis shown in FIGS. 12 and 13, also including results for a single waveguide core with and without optical reflectors blocking

TABLE 3

|  | sMH | MT | CTE (20%) | DTE (30%) |
| --- | --- | --- | --- | --- |
| Dual no block | 5.81 | 76.6 | 110 | 53 |
| Dual with block | 5.06 | 61.3 | 104 | 37 |
| Single core | 6.81 | 65.9 | 128 | 85 |
| Single core with block | 5.75 | 56.7 | 109 | 47 |

Figure 14:
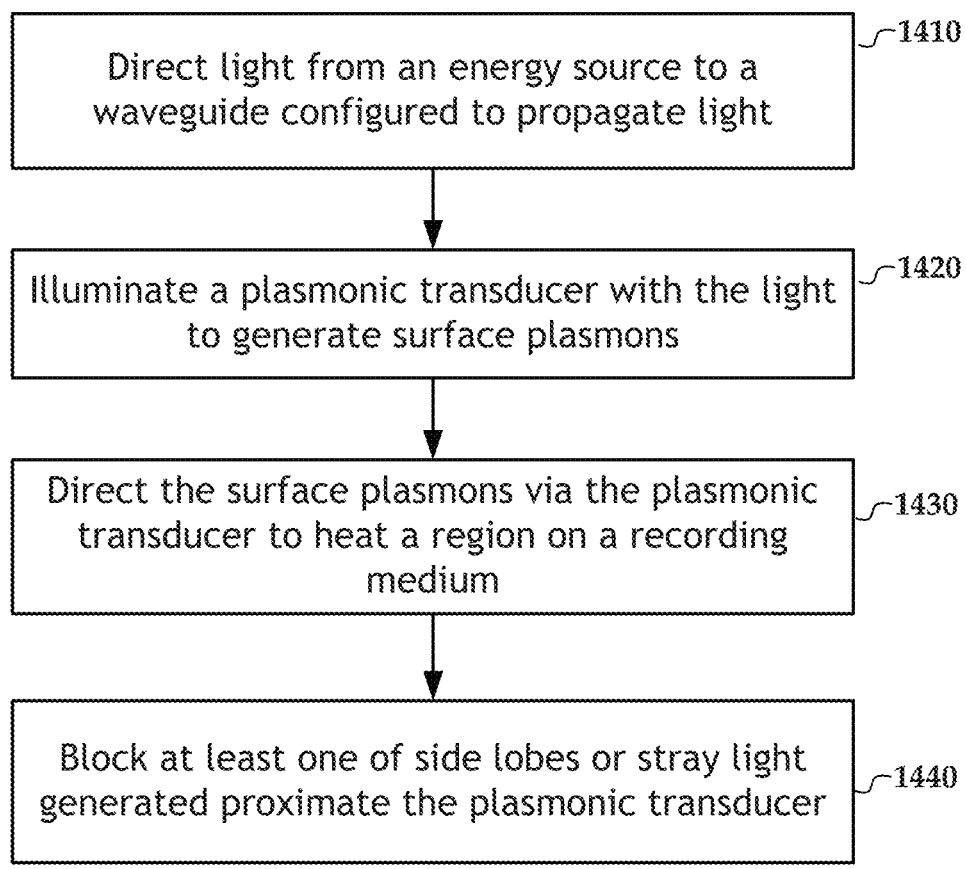
FIG. 14 is a flow diagram illustrating a method in accordance with some embodiments.

FIG. 14 is a flow diagram of a method in accordance with an embodiment. The method includes directing 1410 light from an energy source to a waveguide configured to propagate light. Illuminating 1420 a plasmonic transducer with light to generate surface plasmons on a surface of the plasmonic transducer. Directing 1430 the surface plasmons via the plasmonic transducer to heat a region on a recording medium. The method also includes blocking 1440 at least one of the sidelobes or stray light generated proximate the plasmonic transducer.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Although the subject matter has been described in language specific to structural features and/or methodological acts, it is to be understood that the subject matter defined in the appended claims is not necessarily limited to the specific features or acts described above. Rather, the specific features and acts described above are disclosed as representative forms of implementing the claims.

What is claimed is:

1. An apparatus comprising:
    a waveguide having at least one core layer and a cladding layer;
    a near-field transducer positioned at an end of the waveguide and adjacent to a media-facing surface of a recording head;
    first and second optical reflectors positioned adjacent opposing cross-track edges of the near-field transducer, at least part of the first and second optical reflectors located in the cladding layer, wherein the first and second optical reflectors are joined via a blocking region that is located downtrack from the near-field transducer; and
    a solid-immersion mirror that focuses the light on to the near-field transducer, wherein the first and second optical reflectors block sidelobes generated by the solid-immersion mirror.

2. The apparatus of claim 1, wherein the first and second optical reflectors are located adjacent a down-track side of the near-field transducer.

3. The apparatus of claim 1, wherein the first and second optical reflectors block stray light generated proximate the near-field transducer.

4. The apparatus of claim 1, wherein the first and second optical reflectors are thermally coupled to a heat sink positioned adjacent to the near-field transducer and the media-facing surface.

5. An apparatus comprising:
    a dual core waveguide having first and second cores and a cladding layer, the first and second cores comprising layers that overlap each other in a downtrack direction;
    a near-field transducer positioned at an end of the waveguide and adjacent to a media-facing surface of a recording head, the near-field transducer overlapping the layers of the first and second cores in the downtrack direction; and
    first and second optical reflectors positioned adjacent opposing cross-track edges of the near-field transducer, at least part of the first and second optical reflectors located in the cladding layer, the first and second optical reflectors comprising a gold layer of a thickness that is greater than a skin depth of laser light in gold, the laser light being coupled into the waveguide to excite the near-field transducer.

6. The apparatus of claim 5, further comprising a solid-immersion mirror that focuses the light on to the near-field transducer, wherein the first and second optical reflectors block sidelobes generated by a solid-immersion mirror.

7. The apparatus of claim 5, wherein the first and second optical reflectors block sidelobes generated proximate the near-field transducer.

8. The apparatus of claim 5, wherein the first and second optical reflectors block stray light generated proximate the near-field transducer.

9. The apparatus of claim 5, wherein the optical reflectors are thermally coupled to a heat sink positioned adjacent to the near-field transducer and the media-facing surface.

10. The apparatus of claim 5, wherein the first and second optical reflectors each comprise a surface facing away from and non-parallel to the media-facing surface, the surfaces reducing back-reflection of light to the waveguide.

11. The apparatus of claim 5, wherein the first and second optical reflectors are joined via a blocking region that is located downtrack from the near-field transducer.

12. The apparatus of claim 5, wherein the first and second optical reflectors are positioned at the media-facing surface.

13. The apparatus of claim 5, wherein one of the first and second cores intersect with the first and second optical reflectors.

14. The apparatus of claim 5, wherein the first and second cores are spaced apart from one another in the downtrack direction.

15. The apparatus of claim 5, wherein the first and second cores are configured as channel waveguide cores.

16. The apparatus of claim 5, further comprising a solid immersion mirror at the end of the waveguide, wherein the first and second cores are configured as planar waveguide cores.

17. An apparatus comprising:
a waveguide having at least one core layer and a cladding layer;
a near-field transducer positioned at an end of the waveguide and adjacent to a media-facing surface of a recording head;
blocking region positioned adjacent a down-track side of the near-field transducer, at least part of the blocking region located in the cladding layer, the blocking region blocking stray light generated proximate the near-field transducer; and
first and second optical reflectors positioned adjacent opposing cross-track edges of the near-field transducer, the first and second optical reflectors being joined via the blocking region downtrack from the near-field transducer.

18. The apparatus of claim 17, wherein at least one of the optical reflectors is thermally coupled to a heat sink positioned adjacent to the near-field transducer and the media-facing surface.

19. The apparatus of claim 17, wherein the waveguide comprises a channel waveguide.

\* \* \* \* \*